Dec. 16, 1952   J. G. HARRISON, JR   2,622,040
METHOD OF MAKING STRETCHABLE SUEDE MATERIAL
Filed Sept. 7, 1948
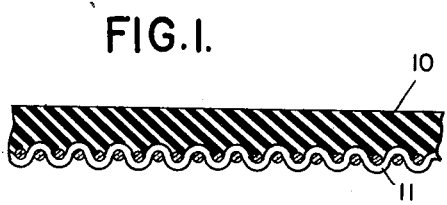
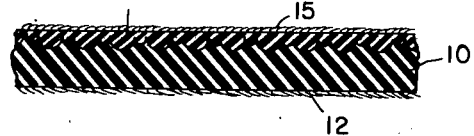
INVENTOR.
JOHN G. HARRISON Jr.
BY Whittemore, Hulbert & Belknap ATTORNEYS Patented Dec. 16, 1952

2,622,040

UNITED STATES PATENT OFFICE 2,622,040

METHOD OF MAKING STRETCHABLE SUEDE MATERIAL

John G. Harrison, Jr., Trenton, N. J., assignor to National Automotive Fibres, Inc., Detroit, Mich., a corporation of Delaware Application September 7, 1948, Serial No. 48,074

2 Claims. (Cl. 117—9)

The present invention relates to stretchable suede and more particularly to stretchable suede provided with sueded surfaces at both sides thereof.

Stretchable suede material has a great many uses and there is a demand for a stretchable suede material which is sueded on both sides. However, in the past there have been difficulties which have prevented satisfactory and economical production of double sueded stretchable material.

In the production of stretchable suede, the usual process is to calender uncured gum stock onto a fabric liner, then coat the exposed surface of the gum stock with a cement, and thereafter suede the coated surface by sifting flock onto said surface while vibrating the material, preferably by beating the underside of the fabric liner. After the gum stock is cured, the fabric liner is stripped from the cured rubber stock.

Previous attempts to coat the reverse side of a sueded rubber sheet have not met with success. In the first place, latex or water type cements were unsatisfactory in adhering the flock to the cured rubber sheet. Also, when cements were employed which consisted of solvent solutions of the same type of rubber as present in the cured sheet, the solvent in the cement tended to swell, curl, or otherwise distort the sheet to the point where processing in the conventional textile and flocking machines was impossible.

According to the present invention, these difficulties have been overcome by using a synthetic rubber which is resistant to natural rubber solvents as the material from which the rubber sheet is formed. It is found that after initial sueding, a cured sheet of this material retains enough tensile strength to resist the tension of the fabric winding devices in the usual flocking machines. This synthetic rubber sheet is initially calendered to a reinforcing woven fabric. The exposed surface of the synthetic rubber sheet is then sueded in the usual manner. Thereafter, the sueded material is cured and the woven fabric is removed. Removal of the woven fabric from the cured synthetic rubber sheet leaves a roughened surface which is impressed with the pattern of the woven fabric. The provision of this roughened surface is of considerable importance since it improves the adhesion or bonding between the synthetic rubber sheet and the natural rubber which is next applied.

Following removal of the woven fabric from the cured synthetic rubber, a rubber cement which comprises an aliphatic solvent and natural rubber is applied to the roughened surface. Synthetic rubber, such for example, as that sold under the trade-name "neoprene" is strongly resistant to the action of aliphatic solvents. "Neoprene" is the trade name for a synthetic rubber-like material made by complete or partial polymerization of 2-chlorobutadiene (1:3) for instance as described in U. S. Patent No. 1,950,432. It is found that the synthetic rubber resists the action of the aliphatic solvent so well that the tendency for swelling and curling is completely avoided.

Preferably the aliphatic solvent natural rubber cement is applied in two coats and the roughened surface initially provided on the cured synthetic sheet improves the adhesion or bonding between the cured synthetic sheet and the rubber deposited in the cement.

The cured synthetic sheet also has sufficient tensile strength to resist the tension of the winding device in the flocking machine and moreover is able to withstand the effect of the vibration without injury.

With the foregoing general description in mind, it is an object of the present invention to provide as a new article of manufacture a stretchable suede material provided with suede on both sides. It is a further object of the present invention to provide a stretchable suede material having an intermediate composite sheet of rubber, the major portion of the sheet being formed of a synthetic rubber strongly resistant to aliphatic solvents, the remainder of said sheet being composed of a relatively thin layer of natural rubber, both sides of said sheet being sueded. It is a further object of the present invention to provide a new method for making stretchable suede material sueded on both sides which comprises sueding the exposed side of a layer of uncured synthetic rubber strongly resistant to aliphatic solvents which is calendered to a woven fabric, curing said sheet and removing the woven fabric, applying a solvent cement, including an aliphatic solvent and natural rubber, to the side of the sheet from which the woven fabric was removed, and sueding the cemented coated surface. Other objects will become apparent as the description proceeds, especially when taken in conjunction with the accompanying drawing in which:

Fig. 1 is a fragmentary diagrammatic sectional view illustrating the material in the first step of the present method.

Fig. 2 is a view similar to Fig. 1 illustrating the material after sueding the first side.

Fig. 3 is a view similar to Fig. 1 illustrating the material after removal of the woven fabric.

Fig. 4 is a view similar to Fig. 1 illustrating the material after the application of cement to the opposite side of the rubber material, and, Fig. 5 is a view similar to Fig. 1 illustrating the completed product.

Referring now to the figures, in Fig. 1 there is shown a portion of a sheet 10 of a rubber-like material which is calendered to a liner which may be woven fabric or any other suitable sheet material indicated at 11. The rubber of the sheet 10 is of a type which strongly resists solvents for rubber of a different type. Preferably the rubber of the sheet 10 is a synthetic rubber, such, for example, as that sold under the tradename "neoprene" which is strongly resistant to aliphatic solvents.

In Fig. 2 the sheet 10 is illustrated as having a suede surface 12 applied thereto by conventional means. This suede surface specifically is applied by coating the exposed surface of the sheet 10 with a cement. Thereafter, the uncured rubber sheet 10 with the reinforcing woven fabric 11 and with its surface coated as above described, is advanced over vibrating means while flock is sifted thereonto. The material is then treated to cure the rubber 10 after which the woven fabric 11 is removed. At this stage of its manufacture, the product is illustrated in Fig. 3 at which time the sheet 10 is cured and the flock 12 is firmly bonded thereto, being to some extent imbedded in the coating of applied rubber. The step of removing the woven fabric 11 from the underside of the sheet 10 leaves a roughened surface as indicated at 13. This surface serves an important function in the production of the material inasmuch as it greatly increases the effectiveness of the bond between this surface and a different rubber-like material later to be applied.

The material illustrated in Fig. 3 is next treated by coating the roughened surface 13 thereof with a solvent cement. The solvent cement employed is one in which the solvent is strongly resisted by the cured rubber sheet 10, but which dissolves a different kind of rubber which is contained in solution therein. Inasmuch as the solvent is strongly resisted by the cured rubber sheet 10, the tendency for the cured rubber sheet 10 to expand and curl is avoided. Preferably, a priming coat and a second coat of the cement are applied so as to completely conceal the roughened surface which was provided at the underside of the sheet 10 with a layer of deposited rubber 14. Thereafter, the material is advanced through a second sueding machine, flock being sifted upon the cement coated surface while the material is vibrated from underneath to form the second sueded surface 15.

In the preferred embodiment of the present invention, in which the rubber sheet 10 is a synthetic rubber strongly resistant to the action of aliphatic solvents, the cement employed in sueding the second surface is an aliphatic solvent and natural rubber cement. Since the natural rubber contained in the solvent cement may not exhibit high adhesion to the synthetic rubber of which the sheet 10 is composed, the provision of the roughened surface at the underside of the sheet 10 is of considerable importance. This surface not only provides a greater area for adhesion, but to some extent it also provides for a mechanical interlock between the relatively thick sheet of the synthetic rubber and the relatively thin ply or layer of natural rubber which remains on the sheet 10 upon evaporation of the aliphatic solvent.

While a specific disclosure has been made of a rubber sheet formed of a synthetic rubber resistant to aliphatic solvents in combination with a cement used for applying the second suede coating, said cement being made up of an aliphatic solvent and natural rubber, it will be readily apparent that the important consideration is that the solvent cement coating shall contain a type of rubber which is soluble in the solvent and that the rubber sheet to which the solvent cement coating is applied shall contain a type of rubber which strongly resists the action of the particular solvent. Thus, it is possible that both of the types of rubber may be synthetic rubbers, the only requirement being that the rubber applied in the form of the cement shall be soluble in a solvent which will not distort or otherwise damage the cured rubber sheet.

The drawings in the foregoing specification constitute a description of the improved stretchable suede and the method of manufacturing the same in such full, clear, concise and exact terms as to enable any person skilled in the art to practice the invention, the scope of which is indicated by the appended claims.

What I claim as my invention is:

1. The method of making stretchable suede material coated on opposite sides with flock which comprises providing an adhesive sheet of uncured synthetic rubber strongly resistant to aliphatic solvents and calendered on one side to a removable fabric liner, depositing flock on the side of the adhesive sheet opposite said liner, curing said adhesive sheet, removing the fabric liner from the cured rubber sheet thereby forming a roughened surface on the rubber sheet, coating said roughened surface with an adhesive cement comprising natural rubber in an aliphatic solvent, depositing flock fibers on the adhesive cement, and drying the coated surface in order to remove the aliphatic solvent.

2. The method of making stretchable suede material coated on opposite sides with flock, which comprises providing an adhesive sheet of uncured rubber of a first type strongly resistant to solvents for rubber of a second and different type, and calendered on one side to a removable fabric liner; depositing flock on the side of the adhesive sheet opposite said liner; curing said adhesive sheet; removing the fabric liner from the cured rubber sheet thereby forming a roughened surface on the cured rubber sheet; coating said roughened surface with an adhesive cement comprising said second and different kind of rubber and a solvent therefor to which said first type of rubber is strongly resistant; depositing flock on said adhesive cement; and drying the coated surface in order to remove the solvent.

JOHN G. HARRISON, Jr.

(References on following page)

REFERENCES CITED

The following references are of record in the file of this patent:

UNITED STATES PATENTS

| Number | Name | Date |
|---|---|---|
| 25,192 | Goodyear | Aug. 23, 1859 |
| 1,152,838 | Price | Sept. 7, 1915 |
| 1,353,599 | Lovell | Sept. 21, 1920 |
| 1,922,020 | Voorhis | Aug. 8, 1933 |
| 2,031,375 | Lilley | Feb. 18, 1936 |
| 2,098,788 | Morgan | Nov. 9, 1937 |
| 2,128,811 | Foster | Aug. 30, 1938 |
| 2,137,686 | Habgood | Nov. 22, 1938 |
| 2,147,218 | Reimel | Feb. 14, 1939 |
| 2,181,247 | Montgomery | Nov. 28, 1939 |
| 2,201,931 | Sullivan | May 21, 1940 |
| 2,203,752 | Smith | June 11, 1940 |
| 2,297,787 | Locke | Oct. 6, 1942 |
| 2,303,202 | Faris et al. | Nov. 24, 1942 |
| 2,332,357 | Uffelman | Oct. 19, 1943 |
| 2,349,153 | Ferrante | May 16, 1944 |
| 2,358,204 | Bird | Sept. 12, 1944 |
| 2,376,777 | Kallander | May 22, 1945 |
| 2,405,943 | Doering et al. | Aug. 20, 1946 |
| 2,480,316 | Blair et al. | Aug. 30, 1949 |

OTHER REFERENCES

Pearson, Crude Rubber and Compounding Ingredients, 3rd ed., 1918, pages 228–242.